March 13, 1962 — P. KLAMP — 3,024,741

CONTROL MECHANISM FOR CONVEYOR SYSTEM

Original Filed Sept. 9, 1957 — 4 Sheets-Sheet 1

INVENTOR.
PAUL KLAMP
BY Whittemore, Hulbert & Belknap
ATTORNEYS

March 13, 1962 P. KLAMP 3,024,741
CONTROL MECHANISM FOR CONVEYOR SYSTEM
Original Filed Sept. 9, 1957 4 Sheets-Sheet 2
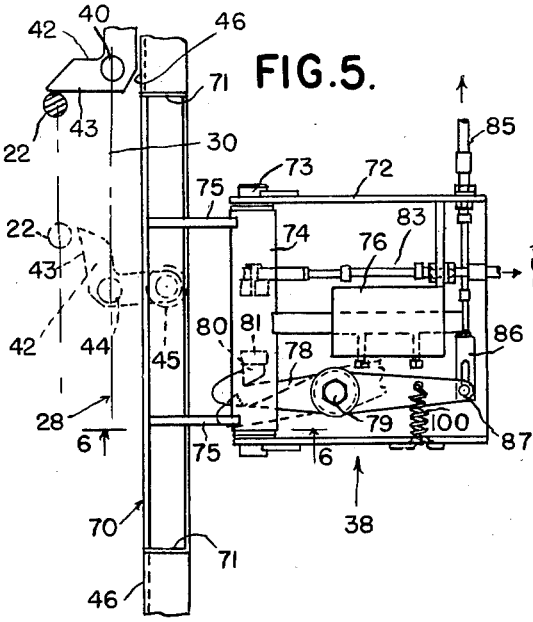
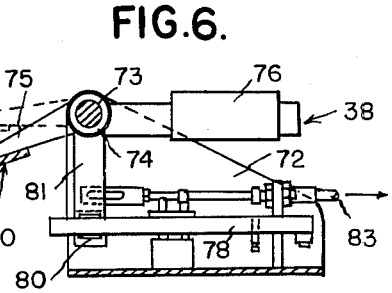
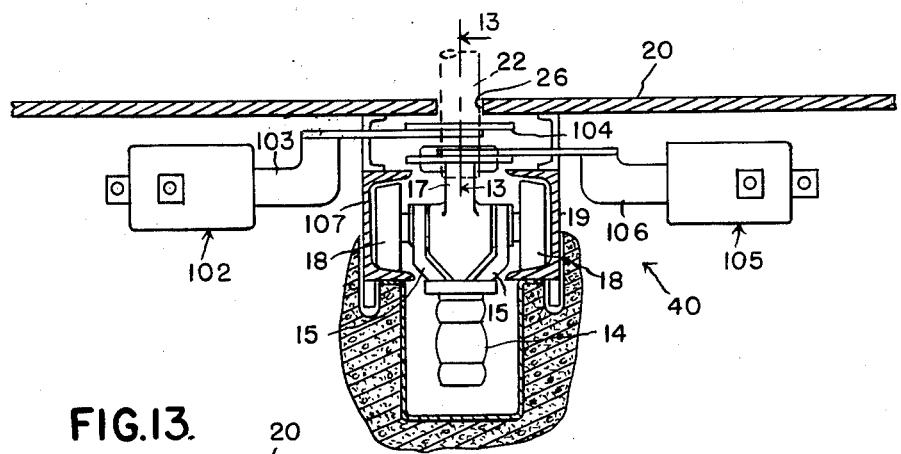
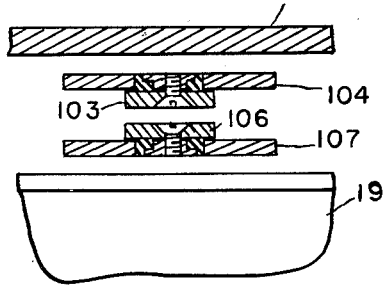
INVENTOR.
PAUL KLAMP
ATTORNEYS March 13, 1962 P. KLAMP 3,024,741
CONTROL MECHANISM FOR CONVEYOR SYSTEM
Original Filed Sept. 9, 1957 4 Sheets-Sheet 3

INVENTOR.
PAUL KLAMP
BY Whittemore, Hulbert &
Belknap
ATTORNEYS

March 13, 1962 P. KLAMP 3,024,741
CONTROL MECHANISM FOR CONVEYOR SYSTEM
Original Filed Sept. 9, 1957 4 Sheets-Sheet 4

INVENTOR.
PAUL KLAMP
BY Whittemore Hulbert &
Belknap
ATTORNEYS

United States Patent Office 3,024,741
Patented Mar. 13, 1962

3,024,741
CONTROL MECHANISM FOR CONVEYOR SYSTEM
Paul Klamp, St. Clair Shores, Mich., assignor to Mechanical Handling Systems, Inc., Detroit, Mich., a corporation of Michigan
Original application Sept. 9, 1957, Ser. No. 682,797. Divided and this application Nov. 9, 1959, Ser. No. 851,651
14 Claims. (Cl. 104—172)

The present specification relates to improvements in a control mechanism for a continuously operating conveyor system, and as illustrated and described, the invention contemplates the association of the control mechanism with sub-floor truck tow lines of a factory, warehouse, loading dock or like installations. The present application is a division of my copending application, Serial No. 682,797, filed September 9, 1957.

While the system chosen for illustration is a simple one, involving but a single main line or track and a single branch or transfer line operating between reaches thereof, it is to be understood that the system may readily be expanded and adapted for far more complex installations, with necessary modification or duplication of the present control mechanism or its operating connections. It will also be evident to those skilled in the art, as the description proceeds, that certain principles of the invention have general applicability in other conveyor equipment, for example, of the overhead type, whether fully powered or power and free, as illustrated and described in the copending applications of Leonard J. Bishop and Joel H. Barlow, Serial No. 619,249, filed October 30, 1956, now Letters Patent No. 2,875,703 of March 3, 1959, and Leonard J. Bishop, Paul Klamp and Robert Krammer, Serial No. 777,386, filed December 1, 1958, now Letters Patent No. 2,982,227 of May 2, 1961.

It is an object of the invention to provide a comprehensive, automatically switching and accumulating control mechanism for a conveyor system including a main power conveyor having chain connected trolleys or like load units and a branch or transfer conveyor way or track at an angle to the path of the main conveyor. It is the function of the control mechanism to effect the accurately timed advance and re-entry of load units from the branch to the main conveyor, to be picked up and advanced by pusher dogs on the latter; and to this end the mechanism includes an improved empty place spotter unit or device to assure that a load unit will be so advanced for pickup only when a main conveyor pusher approaching the re-entry zone is itself unburdened by a load unit.

As herein shown and described, and in accordance with another object of the invention, the empty place spotter device is operatively connected to a further stop and release control device adjacent the branch track or way. Such further device controls the halting of load units to accumulate the same on the branch line, and the empty place spotter signals it to effect the advance and return of such accumulated load units to the main line only when an unoccupied main conveyor pusher approaches the re-entry zone.

A still further object is to provide a combination halt-release and empty place spotter control mechanisms of the sort described, automatically and remotely operated conjointly by main line pushers and by load units pushed thereby toward the juncture or return entrance zone of the branch line with that line. In the event the advancing main conveyor pusher is unburdened by a load unit, a mechanical signal is forwarded by the empty place spotter to control the halt and release device, and a load unit halted at the latter device will advance to the entrance zone.

In the event the main line pusher is burdened by a load unit, the signal to the halt and release device on the branch is mechanically cancelled and nullified. Hence the leading load unit or truck halted on the branch line will not be restored to the main conveyor reach unless and until an empty or unburdened conveyor pusher thereof is approaching.

More specifically, it is an object to provide an empty place spotter device actuated conjointly by main conveyor pushers and units pushed thereby, which mechanism comprises a pair of movable arms at different elevations for engagement and actuation by the respective pushers and pushed units.

Generally speaking, an object is to provide a conveyor system which may be operated as to its control by mechanical means throughout, herein illustrated, for example, as through the agency of flexible cables. Thus there is accomplished a great reduction in installation as well as maintenance cost, as compared with electrically, hydraulically and/or pneumatically operating control systems. The invention also affords a control in which there is no possibility of damage due to mechanical jamming or interference with load units in the re-entry zone.

The foregoing as well as other objects will become more apparent as this description proceeds, especially when considered in connection with the accompanying drawings illustrating the invention, wherein.

Figure 2:
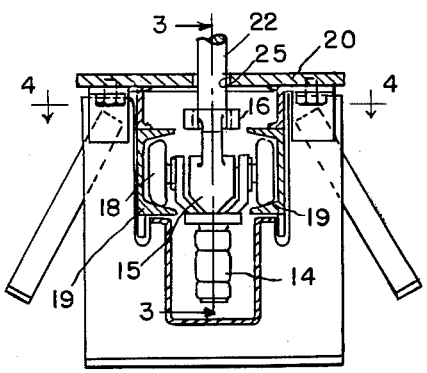
FIG. 2 is a fragmentary view in transverse vertical section along line 2—2 of FIG. 1, showing features of a chain driven main conveyor and its track provisions in relation to a truck tow pin engaged by a pusher trolley of the conveyor.
Figure 4:
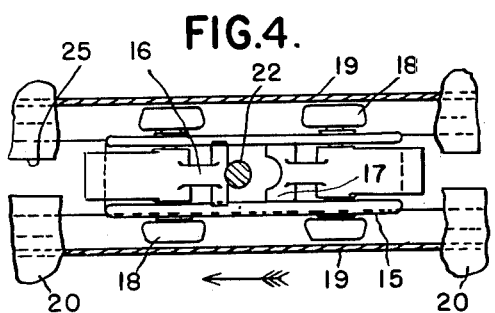
Figure 3:
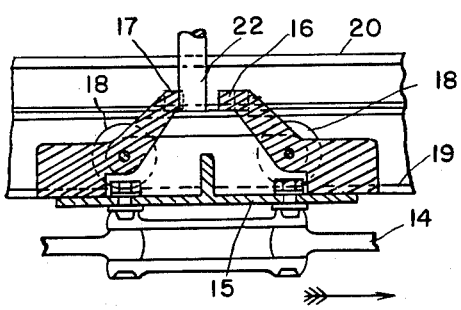
Figure 7:
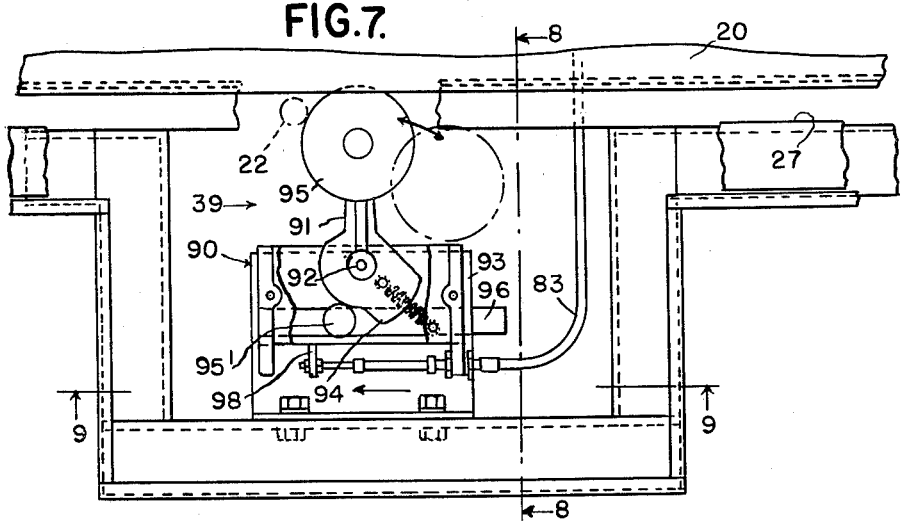
Figure 8:
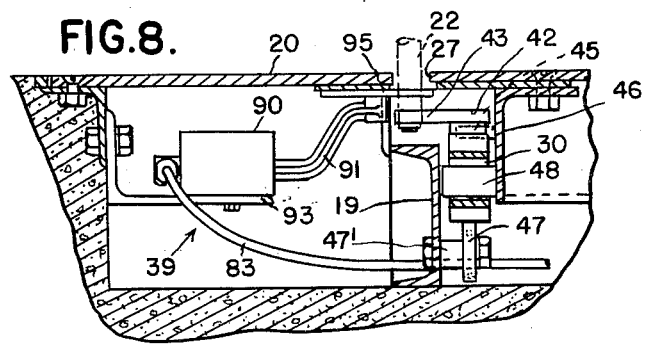
Figure 9:
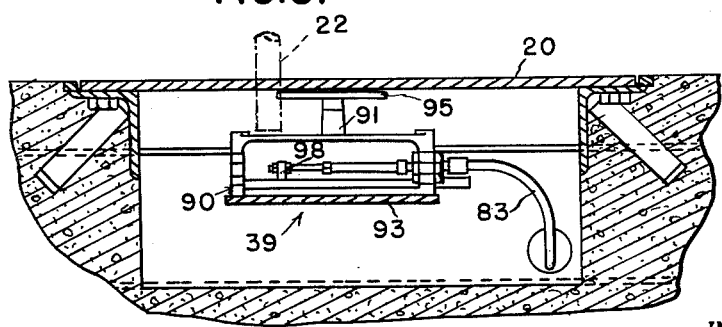
Figure 10:
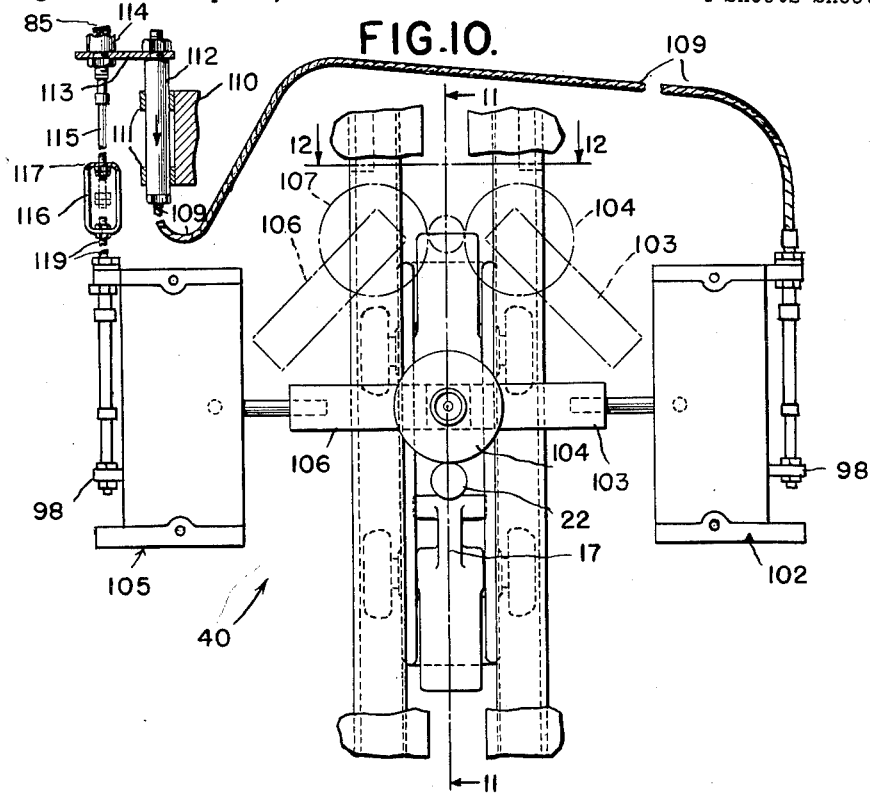
Figure 11:
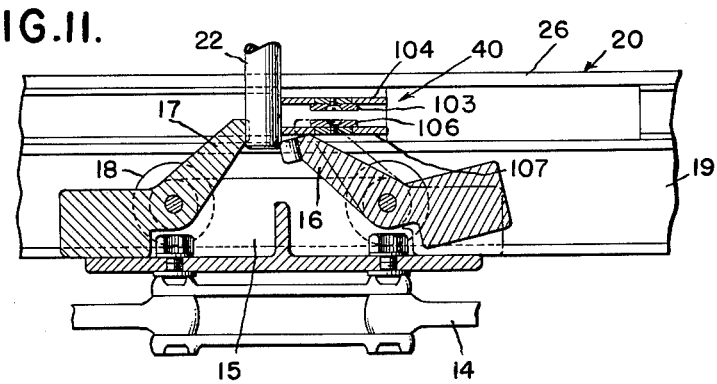

FIGS. 3 and 4 are, respectively, fragmentary views in vertical longitudinal and horizontal section on lines 3—3 and 4—4 of FIG. 2;

FIG. 5 is a fragmentary top plan view showing a releasable dog back-up rail mechanism of a truck halt and release device associated with the branch line of the system, different positions of a branch track conveyor dog as controlled by the rail mechanism being shown in solid and dotted line, respectively;

FIG. 6 is a view in transverse vertical section along line 6—6 of FIG. 5, alternate positions of the truck halt and release mechanism or device being shown in solid and dotted lines;

FIG. 7 is a fragmentary plan view of a release reset device controlling the operation of the mechanism of FIGS. 5 and 6, under the control of trucks traversing the branch track;

FIGS. 8 and 9, respectively, are views in vertical section along lines 8—8 and 9—9 of FIG. 7;

FIG. 10 is a fragmentary top plan view showing an empty place spotter control mechanism associated with the main conveyor return reach and operating to detect the presence of an unloaded main conveyor trolley, and thus govern the actuation of the branch track truck release mechanism of FIGS. 5 and 6 in preparing a truck for return to the main line;

FIGS. 11 and 12 are, respectively, views in vertical section along lines 11—11 and 12—12 of FIG. 10; and FIG. 13 is a view in longitudinal vertical section along line 13—13 of FIG. 12.

Figure 1:
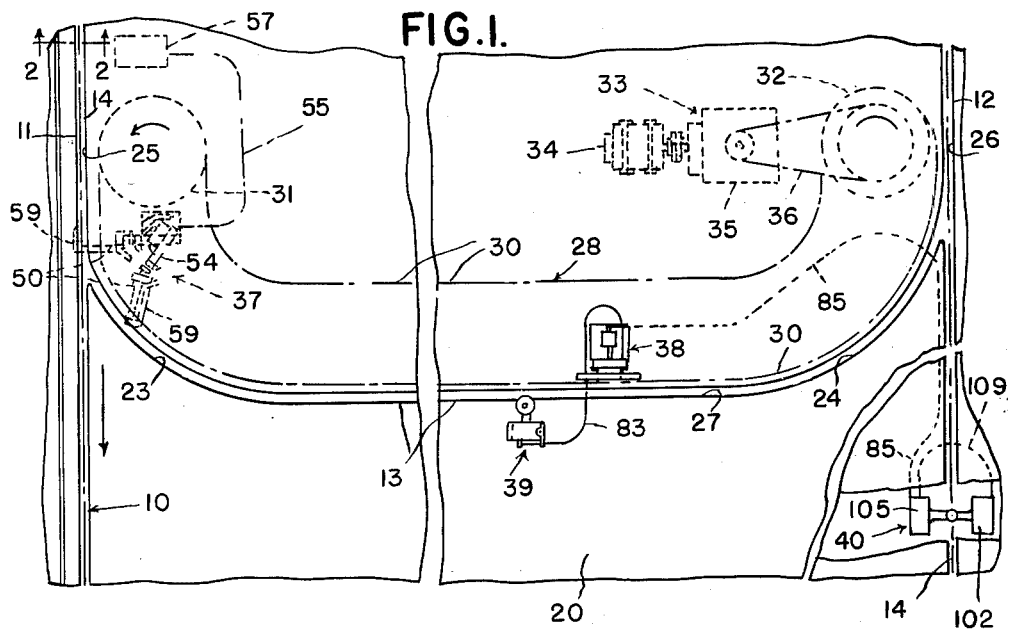
FIG. 1 is a fragmentary top plan view, partially broken away, showing schematically the general layout of the improved conveyor system.

Referring first to FIG. 1 of the drawings for a schematic plan layout of the overall system, the reference numeral 10 generally designates a main sub-floor conveyor, operating in the direction indicated by arrow, and characterized by a longitudinal reach or portion 11 from which it is desired to divert the tow pins of selected load transporting trucks or dollies. The numeral 12 designates another, return reach of conveyor 10, into which it is desired to restore such trucks by conveying them along an intermediate branch reach or track portion 13 connecting the reaches 11 and 12.

It is to be understood that FIG. 1 simply typifies a conveyor cross over and connect installation, and that the invention equally applies to other desired layouts, as for example a dead storage branch associated with a main powered conveyor, a return from such a branch to a conveyor, etc. The invention is unlimited in respect to the simplicity or complexity of the particular desired setting.

As shown in FIGS. 2, 3 and 4, the main subfloor conveyor 10 includes an endless chain 14 powered from any appropriate source, to which standard type trolleys 15 having counterweighted, retractable front restraining and rear driving dogs 16, 17, respectively, are pivotally mounted in suitable longitudinal spacing, in an entirely conventional manner. The trolleys 15 are spaced on chain 14 at intervals of, say, twelve feet, and rollers 18 support them to ride opposed channel track sections 19 of the main conveyor 10. This structure is appropriately mounted beneath floor plating 20, which is slotted to receive depending tow pins 22 of the load bearing trucks. Structural details of the truck, truck tow pin arrangement and associated means to govern the operations of transferring the control of the trucks to and from a branch track conveyor as hereinafter described.

Communication of the branch 13 with the main conveyor reach 11 is established through an arcuate floor slot 23; while communication of the branch track 13 with the other or main conveyor return reach 12 is similarly had through an arcuate floor slot 24. The floor slot of the main conveyor reach 11 is designated 25, that of the return reach 12 is designated 26, while the intermediate floor slot of the branch or transfer conveyor reach 13 bears the reference numeral 27.

The transfer conveyor is generally designated 28. As shown in FIG. 1, it takes the form of an endless chain 30 trained about a vertically journalled idler sprocket 31 adjacent main reach 11 and at its opposite extreme about a driving sprocket 32 adjacent the track return reach 12. Conveyor 28 traverses an orbital path which is generally U-shaped as viewed in plan, in conformity with the outline of branch reach 13 and its merger with the main reaches 11, 12.

The numeral 33 generally designates an independent driving unit for the branch conveyor; it may consist of a motor 34, a speed reducer 35 driven thereby to drop the speed of the sub-floor conveyor chain 30 to about one-half of that of the main conveyor chain 14, and a chain and sprocket arrangement 36 through which the driving connection to chain sprocket 32 is made.

The reference numeral 37 generally designates (FIG. 1) an automatic pull-out switch mechanism adjacent the zone of exit from main reach 11; the reference numeral 38 generally designates a truck release mechanism associated with branch reach 13 adjacent the return or reentrance reach 12; the reference numeral 39 generally designates a truck release reset unit in part controlling the mechanism 38; and the reference numeral 40 generally designates a control mechanism or station adjacent the main return reach 12, in advance of the branch 13, at which the control of the truck release mechanism 38 is perfected. This is done by automatically detecting and signaling as to whether or not a conveyor trolley 15 approaching on the reach 12 is hooked to and forwarding a truck. Mechanism 40 is hereinafter referred to as an empty place spotter.

Details of the pull-out switch mechanism 37 are not dealt with in the present application, being covered in application Serial No. 682,797 identified above. Accordingly, only the major features of the switch unit 37 require mention here.

As schematically indicated in FIGS. 5 and 8, the chain 30 is provided, at intervals of, say, two feet, with pivoted truck driving dogs 42 of L-shaped outline. Each dog has a foot 43 engageable with a truck tow pin 22 to advance the same, a medial pivot at 44 to a link of the conveyor chain 30, and a follower roller 45 above the chain on an arm at 90° to the foot. This roller normally engages a vertical tread surface on a horizontally disposed side guide rail 46, beneath floor plate 20 and paralleling the slots 23, 24 and 25 of the latter, to maintain the dog 42 in the operative solid line position of FIG. 5, in both the main track reach 11 and a portion of the branch track reach 13. However, as hereinafter described, the dog is adapted to swing backwardly upon arrival at the truck release mechanism or station 38 adjacent branch track 13, as shown in dotted line in FIG. 5.

It will be seen by reference to FIG. 8 that the branch or transfer chain 30 is supported for movement by appropriate anti-friction provisions thereneath, which may be in the form of a series of horizontally journalled, ball bearing type rollers 47 supported by track section 19, with spacers 47′ interposed between section 19 and the inner fixed races of the roller bearings, the chain 30 passing over the top of the rollers 47. The chain is also provided with vertically journalled guide rollers 48 operating between the guide rail 46 and the adjacent side of a trolley track section 19 to guide the chain 30 about the path depicted in FIG. 1. Furthermore, it is seen that the transfer chain 30 and its pusher dogs 42 approach the pull-out switch mechanism 37 in parallel, side by side relation to the main conveyor chain 14 and trolleys 15 and their dogs 16, with little lateral clearance between the respective dogs.

The pull-out switch mechanism 37, as schematically shown in FIG. 1, includes a primary pull-out lever or arm 50 appropriately journalled beneath the floor plate 20 on an upright pivot. The arm carries a barrel shaped cam follower roller 54 journalled on a horizontal axis, which roller is weighted and is adapted to roll upon a fixed arcuate helical cam track, as illustrated and described in detail in my application, Serial No. 682,797.

The pull-out lever 50 is normally held in the position of FIG. 1, with its follower roller atop the highest rise of its cam track by means of a suitable latch engaging the lever. When the latch is released from this engagement, as by actuation of flexible cable 55 under the control of an advancing truck at a switch signalling station, as shown and described in my prior application, the pull-out lever 50 is swung clockwise, under the gravitational force of its weighted barrel roller 54, to its operative position. Here the lever 50 awaits engagement by the advancing main conveyor trolley dog 17. The lever is suitably restrained in this position against further clockwise movement.

A pull-out or diverting arm or hook 59 is pivoted on lever 50 on a vertical hinge pin, and the hook 59 terminates in a rearwardly disposed hooking finger which lies on the side of the slot 25 remote from the hook arm pivot. Hook or diverting arm 59 also carries a cam follower roller (not shown) which is adapted to engage a fixed cam when the arm 50 is swung counterclockwise as viewed in FIG. 1 into an inoperative position in which it is latched in place. As shown and described in my prior application, the camming action causes arm 59 to turn individually counterclockwise about its pivot on lever 50, so that its hook finger 61 swings out of the way of the truck tow pin 22, having in its movement up to this point drawn the tow pin into the arcuate switch-out floor slot 23 leading to the branch track 13. A spring resists this individual swing, and restores the hook 59 to operative position once its follower roller disengages its cam.

The automatic switch actuating provisions to unlatch lever 50 for clockwise swing to operative truck intercepting position, these provisions involving the advance signal station or unit 57, as connected by cable 55 to the switch mechanism 37 and as tripped by a control unit on the truck, are illustrated and described in my prior copending application, Serial No. 682,797, to which reference may be had for details of structure and function.

In traversing the branch track 13 the branch conveyor pusher dogs 42 are restrained from clockwise rotation, as viewed in plan in FIG. 5, by rolling engagement of their follower roll 45 with the rail 46, which follows the contour of the floor slots 25, 23, 27, until arrival at the truck release station 38, as will be described. Since the main track chain 14 and trolleys 15 are driven at about twice the speed of the branch track chain 30 and its pivoted pusher dogs 42, these dogs may swing counter-clockwise, as viewed in plan, in the event that they are overtaken by an advancing truck tow pin 22, thus permitting the tow pin to clear the dog and advance ahead of the same, for subsequent pick-up by that dog. The dogs may be resiliently or otherwise biased to return the same clockwise to rail engaging position.

The switched trucks are pushed by the branch track conveyor chain 30 until they reach the truck release mechanism-station 38, at which it may be assumed that it is desired that they halt. This is accomplished by permitting the dog 42 to release from the tow pin, and swing clockwise, as viewed in FIG. 5, i.e., from the solid to the dotted line position. Such release is under the control of the truck release unit 39 appearing in FIGS. 1 and 7 through 9. Structural features of the release mechanism or station 38 appear in FIGS. 5 and 6 of the drawings.

Referring first to FIGS. 5 and 6, the reference numeral 70 generally designates a movable dog back-up rail located in a gap 71 of the fixed backing rail structure 46, in the truck release zone of the branch track 13. A suitable rigid supporting bracket or framework 72 of U-shaped outline is mounted adjacent the track in this zone, which bracket is provided with a longitudinally disposed pin 73 upon which is journalled an elongated bearing hub 74, to which the back-up rail 70 is secured by arms 75. The rear counterweight 76 normally urges the rail 70 clockwise, as viewed in FIG. 6, and upwardly into longitudinal alignment with the portions of the backing rail 46 at either end thereof. However, the rail 70 is normally held in the depressed, solid line position of FIG. 6, in which it is ineffective to hold the branch track dog 42 in driving engagement with the truck tow pin 22. This is accomplished by use of a hooked latch arm 78 journalled on an upright pin 79 on bracket 72, the arm engaging a detent shoulder 80 which is carried by a depending bar 81 secured to the back-up rail hub 74.

A flexible reset cable 83 is secured to a fixed downward projection on the hub 74, and is employed in automatically resetting the back-up rail 70 to its depressed position shown in solid line in FIG. 6. A further flexible cable 85 has a slotted one-way pull connector 86 connecting it at 87 to the outer end of the latch arm 78, so that when the cable 85 is tensioned, the movable back-up rail 70 is unlatched for a counterweighted return to the dotted line position of FIG. 6, in which it laterally sustains the branch conveyor dogs 42, being coplanar with its pivot 73 to receive the thrust of the dogs.

The cable 83 is tensioned to set the rail 70 in the depressed position by the truck release and reset unit 39, in regard to which reference should herein be made to FIGS. 7, 8 and 9. The reference numeral 90 generally designates a cable pull mechanism involving a trip arm 91 pivoted at 92 on a supporting frame 93 and provided with an operating cam 94 outwardly of its pivot. The outer end of the arm 91 carries a tappet roller 95 of substantial diameter, which is adapted to be engaged by an advancing tow pin 22. So engaged, arm 91 is swung clockwise, as viewed in FIG. 7, the cam 94 engaging and operating a follower 95' on a rod 96 which is slidably mounted by the frame 93. Rod 96 is connected by a lateral lug 98 with the cable wire of the flexible cable 83 of the truck release mechanism 38 (FIGS. 5 and 6). Thus the movable back-up rail 70 is pulled to its depressed position, in which it is hooked and held by the latch arm 78. A coil spring 100 maintains the latching engagement until it is released by operation of the flexible cable 85, as will be described.

Trucks thus halted at station 38 will accumulate there, being automatically uncoupled from branch conveyor 28, until a main track trolley 15 which is unburdened by a truck advances along the return reach 12 of the main track. When this occurs it is in order to continue the advance of the first truck halted at station 38. As explained above, the movable back-up rail 70 is unlatched and swung upwards to its dotted line position of FIG. 6 to do this.

The empty place spotter 40 is provided in order to insure that a truck will not be returned to the main line until the advancing main conveyor trolley is free. As indicated in FIG. 1, this spotter unit is connected by the flexible cable 85 with the truck release mechanism 38.

Referring now to FIGS. 10 through 13 of the drawings, the empty place spotter 40 comprises two cable pull mechanisms similar to the mechanism 90 of the truck release reset unit 39. Their action is the same as the action of that unit, hence it has not been deemed necessary to repeat details of their structure in FIGS. 10 through 13. Of the two cable pull units, that designated 102 in FIGS. 10 and 12 is a unit having its operating arm 103 and tappet roller 104 actuated only by truck tow pins 22, since the arm and roller are positioned at a sufficient elevation as to be missed by a trolley 15. The other cable pull unit 105 has its operating arm 106 and tappet roller 107 positioned sufficiently low that they are engaged and operated by either an empty or loaded conveyor trolley 15.

Empty place spotter 40 is cable connected to the truck release mechanism 38 in such manner that the latter will be operated to raise the back-up rail 70 to its operative position only in the event a trolley 15 free of a truck is advancing on the main track return reach 12. To this end a flexible disabling cable 109 operated by the cable pull unit 102 is brought out to a fixed support 110 having guides 111 in which a guide rod 112 connected to the cable 109 slides. At its other end the rod 112 carries an arm 113 to which is clamped the outer sheath 114 of the flexible cable 85 leading to truck release mechanism 38. Thus, upon movement of the guide rod 112 of cable 109 downward, as viewed in FIG. 10, under a pull of disabling cable 109, the cable 85 is moved bodily, with no tensioning of its internal wire element 115.

The adjacent end of this tension element 115 is slidably received in one end of an open-sided rectangular connector link 116 and is provided with an enlarged head 117 inwardly of the outline of the link, which may be engaged by the latter to pull the wire 115. Thus, it is seen that bodily shifting movement of the cable 85 will move the element 115 and head 117 from their solid line position of FIG. 10 to the dotted line position. The link 116 is fixedly connected at its opposite end 118 to a cable 119 operated by the cable pull unit 105.

Accordingly, as an empty trolley 15 approaches on the main track return reach 12, it will operate the arm 106 of cable pull unit 105. This tensions cable 119, link 116 and the tension element 115 of flexible cable 85, as shown in FIG. 10, whereupon cable 85 releases the latch arm 78 (FIG. 5) for the movable back-up rail 70. The latter is moved by its counterpoise 76 to its upper, operative position, whereupon a truck halted at the station 38 will then be picked up by the next advancing branch conveyor dog 42, and forwarded onto the main track return reach 12. It is picked up by the empty trolley 15 which initiated the cable signal.

However, in the event that the advancing trolley is occupied by a tow pin 22, the latter will engage and operate the arm 103 of the cable pull unit 102, just as the unit 105 is actuated. This bodily shifts cable 85 to such a position (dot-dash line in FIG. 10) that the simultaneous tensioning of the connector link 116 by unit 105 is ineffective to tension the wire element 115 of the cable. Accordingly, a truck at the station or unit 38 is missed by the branch conveyor dog 42, since the latter unit 38 is not cable operated.

It is desirable to time the travel of the branch track chain 30 in relation to that of main track chain 14 only sufficiently closely to minimize the likelihood of interference of a branch and main conveyor dogs 42, 17, respectively, as they approach the junction of the two tracks. If desired, an appropriate lateral clearance may be set up to avoid this possibility, and it is not especially serious, in any event, in view of the fact that the branch conveyor chain 30 travels at but half the speed of the main chain 14, and that the branch pusher dogs 42 are pivoted for counterclockwise rotation about their axes. A trolley 15 will always speed past and clear a dog 42 should engagement take place.

Structural details of the truck controlled by the system, as well as a signal flag or control unit on the truck by which the advance signal unit 57 (FIG. 1) is selectively operated to control switch mechanism 37 or its equivalent, are shown and described in my copending application, to which reference may be had regarding details of structure and operation.

Operation

Since the operation of the individual basic components 38, 39 and 40 of the improved conveyor control apparatus or system has been explained in the description of the structural features thereof, as well as the operational effect of those component units on one another, it is believed necessary only to sketch out the operation of the system, as a whole, in a brief way.

Assuming that the trucks have been adjusted as to the settings of their respective individual signal units (not shown) to trip the signal unit 57 and cause the tow pins 22 of the trucks to be switched by mechanism 37 onto the branch track reach 13, with the tow pin 22 under the control of a dog 42 on the branch conveyor chain 30, it is forwarded by this dog to the truck release and reset station 38, the backing rail 70 of which is at this time latched in its depressed position, shown in solid line in FIG. 6. Here, since lateral support of the trolley dog is lacking, the dog falls away from the tow pin, and the motion of the truck comes to a halt. Halting may be assisted by the provision of suitable frictional snubbing or like restraining means at the truck release mechanism 38, and, if desired, an automatic anti-shock accumulator unit (not shown, but of the type illustrated in my prior copending application) may also be employed in high speed or heavy load work handling.

The release mechanism 38 is conditioned as described by the cable pull unit 93 of the reset unit 39 in advance of the mechanism 38. Setting is under mechanical control of the tow pin 22 in question, as it engages and swings the operating arm 91 of the cable pull unit 93.

The empty place spotter 40 signals the unit 38 for the return of a halted branch track truck onto the main conveyor reach 12 when, and only when, a main conveyor trolley 15, which trips the cable pull unit 105 of the empty place spotter, is also unoccupied by a truck tow pin 22. This causes cable 85 to unlatch the pivoted back-up rail 70, for branch conveyor dogs 42, which is then counterweighted upwardly to position to back up the dogs. The branch track in question is forwarded by the next advancing dog 42.

In the event the signaling main conveyor trolley 15 is occupied by a tow pin, the actuation of the cable pull unit 102 has the effect of disabling the actuation of cable 85, by affording a lost motion between the same and the tripped cable pull unit 105, so that the back-up rail 70 remains latched in depressed position.

As advanced by the dog 42, the returned truck 122 passes onto the main conveyor return reach 12 where it is picked up by the signaling trolley 15 and continues along the main conveyor path.

The apparatus is simple, rugged and inexpensive as to its parts. All controls are operated mechanically and under motivation by the trucks alone. The need for accurate synchronization of conveyors is avoided. As indicated, the system is extremely versatile in regard to its possible installations, and standard forms may be employed in numerous different installations, each necessarily more or less custom designed as to the placement of its components.

What I claim as my invention is:

1. In a conveyor system for association with a pair of tracks in communication with one another at an angle, a first conveyor having load engaging dogs and operating parallel to one of said tracks to forward load units therealong, the dogs of said conveyor being mounted for movement relative thereto, a second conveyor having dogs operating parallel to the other track to forward load units therealong, and mechanism controlling the accumulation of load units on said one track and the transfer of said units between said tracks, comprising a control member movable between positions in which it engages and holds the movable dogs of said first conveyor in load unit driving engagement and releases said dogs from such driving engagement, and a signal unit adjacent the other track, said signal unit being operatively connected to said control member and being responsive to the absence or presence of a dog-engaged load unit on said other track advanced by the second conveyor to forward, or fail to forward a restoring signal to operate said control member to dog-holding position.

2. A conveyor system in accordance with claim 1, in which said signal unit comprises a pair of elements, one positioned for engagement and operation only by a dog of the second conveyor and the other positioned for engagement and operation by a load unit advanced thereby, the operative connection of said signal unit to said control member including said elements, and means operatively connecting the same to one another to nullify a signaling operation of the former when said elements are engaged by a dog and load unit, respectively.

3. In a conveyor system for association with a pair of tracks in communication with one another at an angle, a first conveyor having load engaging dogs and operating parallel to one of said tracks to forward load units therealong, the dogs of said conveyor being individually pivoted thereon for movement relative thereto, a second conveyor having dogs operating parallel to the other track to forward load units therealong, and mechanism controlling the accumulation of load units on said one track and the transfer of said units between said tracks, comprising a rail member paralleling said one track and movable between positions in which it engages and holds the individually pivoted dogs of said first conveyor in driving engagement with load units traversing said first track, and releases said dogs from such driving engagement by individual movement thereof, and a signal unit adjacent the other track, said signal unit being operatively connected to said rail member and being responsive to the absence or presence of a dog-engaged load unit on said other track advanced by the second conveyor to forward, or fail to forward, a restoring signal to operate said rail member to dog-holding position.

4. A conveyor system in accordance with claim 3, in which said signal unit comprises a pair of elements, one positioned for engagement and operation only by a dog of the second conveyor and the other positioned for engagement and operation by a load unit advanced thereby, the operative connection of said signal unit to said rail member including said elements, and means operatively connecting the same to one another to nullify a signaling operation of the former when said elements are engaged by a dog and load unit, respectively.

5. In a sub-floor system for the control of floor travel of a truck or like mobile unit having a tow pin guided in a floor slot and rivingly engageable by a dog of a conveyor traveling beneath said floor and adjacent said slot, the improvement comprising a release and reset mechanism adjacent said slot to control the accumulation of said mobile units therealong, said mechanism including a guide rail movable between positions in which it is engaged by said dog to sustain the same for driving engagement with a tow pin, and in which it disengages said dog, and means to cause said rail to move between said positions.

6. In a sub-floor system for the control of floor travel of a truck or like mobile unit having a tow pin guided in a floor slot and drivingly engageable by a dog of a conveyor traveling beneath said floor and adjacent said slot, the improvement comprising a release and reset mechanism adjacent said slot to control the accumulation of said mobile units therealong, said mechanism including a guide rail movable between positions in which it is engaged by said dog to sustain the same for driving engagement with a tow pin, and in which it disengages said dog, and means mechanically operated by advancing tow pins to cause said rail to move between said positions.

7. In a sub-floor system for the control of floor travel of a truck or like mobile unit having a tow pin guided in a floor slot and drivingly engageable by a dog of a conveyor traveling beneath said floor and adjacent said slot, the improvement comprising a release and reset mechanism adjacent said slot to control the accumulation of said mobile units therealong, said mechanism including a guide rail movable between positions in which it is engaged by said dog to sustain the same for driving engagement with a tow pin, and in which it disengages said dog, means releasably maintaining said rail in said dog engaging and sustaining position, and means mechanically connected to said last named means to release the same and cause said rail to move between said positions.

8. In a sub-floor system for the control of floor travel of a truck or like mobile unit having a tow pin guided in a floor slot and drivingly engageable by a dog of a conveyor traveling beneath said floor and adjacent said slot, the improvement comprising a release and reset mechanism adjacent said slot to control the accumulation of said mobile units therealong, said mechanism including a guide rail movable between positions in which it is engaged by said dog to sustain the same for driving engagement with a tow pin, and in which it disengages said dog, means releasably maintaining said rail in said dog engaging and sustaining position, and means mechanically operated by advancing tow pins and mechanically connected to said last named means to release the same and cause said rail to move between said positions.

9. A control mechanism to detect the presence or absence of units propelled by members of a moving conveyor and to initiate a signal accordingly, said mechanism being positioned adjacent the path of travel of said conveyor and comprising a first movable control member adapted to be engaged and moved by a conveyor member, a second movable control member engageable and movable by a propelled unit, signal means adapted to be operatively connected to said first control member to transmit a mechanical signal from said mechanism in response to movement of said first control member, and means operatively connected to said second control member and responsive to movement of the latter to render said signal means ineffective to transmit said mechanical signal.

10. A control mechanism to detect the presence or absence of units propelled by members of a moving conveyor and to initiate a signal accordingly, said mechanism being positioned adjacent the path of travel of said conveyor and comprising a first movable control member adapted to be engaged and moved by a conveyor member, a second movable control member engageable and movable by a propelled unit, signal means adapted to be operatively connected to said first control member to transmit a mechanical signal from said mechanism in response to movement of said first control member, and means operatively connected to said second control member and responsive to movement of the latter to move said signal means and render the same ineffective to transmit said mechanical signal.

11. A control mechanism in accordance with claim 10, in which said first and second control members are pivotally mounted arm members of similar control units positioned on opposite sides of the path of movement of the conveyor, one of said units being connected to said signal means to move the latter, the other of said control units acting on said signal means to nullify the signal.

12. A control mechanism to detect the presence or absence of units propelled by members of a moving conveyor traveling in vertically spaced relation to said unit and to initiate a signal accordingly, said mechanism being positioned adjacent the path of travel of said conveyor and comprising a first movable control member adapted to be engaged and moved by a conveyor member, a second movable control member normally positioned in vertical register with said first control member and engageable and movable by a propelled unit simultaneously with movement of said first member by a conveyor member, signal means adapted to be operatively connected to said first control member to transmit a mechanical signal from said mechanism in response to movement of said first control member, and means operatively connected to said second control member and responsive to movement of the latter to render said signal means ineffective to transmit said mechanical signal.

13. Conveyor control apparatus, comprising a device to retard the travel of units along a conveyor path prior to entry to the path of a conveyor moving at an angle to said first path, and a mechanism to detect the presence or absence of units propelled by members of said moving conveyor and to initiate a signal accordingly, said mechanism being positioned adjacent the path of travel of said conveyor and comprising a first movable control member adapted to be engaged and moved by a conveyor member, a second movable control member engageable and movable by a propelled unit, signal means operatively connected to said first control member and said device to transmit a mechanical signal from said mechanism in response to movement of said first control member, and means operatively connected to said second control member and responsive to movement of the latter to render said signal means ineffective to transmit said mechanical signal.

14. Conveyor control apparatus comprising a device to retard the travel of units along a conveyor path prior to entry to the path of a conveyor moving at an angle to said first path, and a mechanism to detect the presence or absence of units propelled by members of said moving conveyor traveling in vertically spaced relation to said unit and to initiate a signal accordingly, said mechanism being positioned adjacent the path of travel of said conveyor and comprising a first movable control member adapted to be engaged and moved by a conveyor member, a second movable control member normally positioned in vertical register with said first control member and engageable and movable by a propelled unit simultaneously with movement of said first member by a conveyor member, signal means operatively connected to said first control member and said device to transmit a mechanical signal from said mechanism in response to movement of said first control member, and means operatively connected to said second control member and responsive to movement of the latter to render said signal means ineffective to transmit said mechanical signal.

No references cited.